(12) United States Patent
Fukushi

(10) Patent No.: US 11,768,646 B2
(45) Date of Patent: Sep. 26, 2023

(54) IMAGE FORMING SYSTEM AND OPERATION UNIT

(71) Applicant: CANON KABUSHIKI KAISHA, Tokyo (JP)

(72) Inventor: Kenji Fukushi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/687,810

(22) Filed: Mar. 7, 2022

(65) Prior Publication Data

US 2022/0317959 A1 Oct. 6, 2022

(30) Foreign Application Priority Data

Mar. 31, 2021 (JP) ................................ 2021-059144

(51) Int. Cl.
*G06F 3/12* (2006.01)
(52) U.S. Cl.
CPC .......... *G06F 3/1258* (2013.01); *G06F 3/1204* (2013.01); *G06F 3/1205* (2013.01); *G06F 3/1238* (2013.01)

(58) Field of Classification Search
None
See application file for complete search history.

(56) References Cited

U.S. PATENT DOCUMENTS

| 2015/0029529 | A1* | 1/2015 | Oda | H04N 1/00315 |
| | | | | 358/1.13 |
| 2016/0352936 | A1* | 12/2016 | Kanbayashi | H04N 1/00411 |
| 2021/0075925 | A1* | 3/2021 | Minamikawa | H04N 1/00506 |

* cited by examiner

*Primary Examiner* — Frantz Bataille
(74) *Attorney, Agent, or Firm* — ROSSI, KIMMS & McDOWELL LLP

(57) ABSTRACT

Information to be displayed (display information) on a display of an operation unit for use in operating of an image forming apparatus corresponds to each user. Based on a first instruction from the operation unit, the operation unit reads out the display information stored in a second memory provided in the image forming apparatus and stores the display information into a first memory. Based on a second instruction from the operation unit, the display information is transmitted from the operation unit to the image forming apparatus and is stored in the second memory provided in the image forming apparatus.

20 Claims, 13 Drawing Sheets

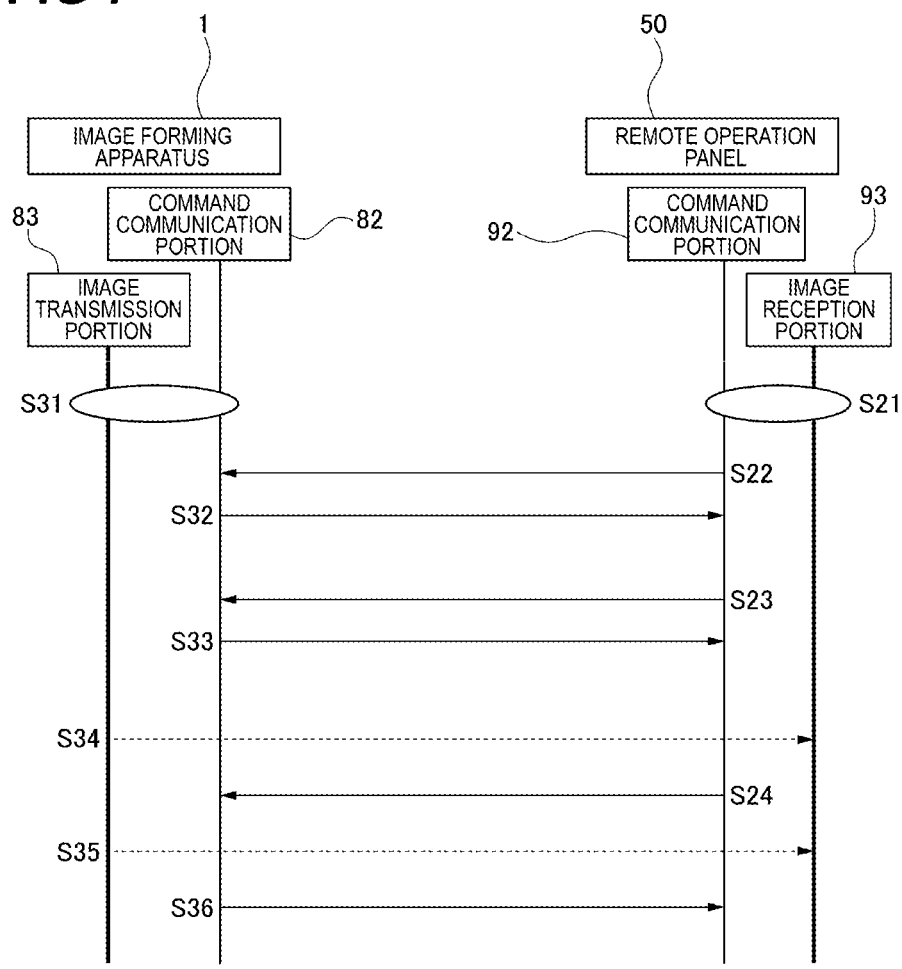

FIG 12

| SETTING ITEMS | DEFAULT VALUE | ID:5X5X | ID:6X6X |
|---|---|---|---|
| NUMBER OF BUTTONS | 3 | 4 | 2 |
| ARRANGEMENT OF BUTTONS | 1 | 2 | 2 |
| ALLOCATION OF BUTTONS | 1 | 1 | 2 |
| SHAPE OF BUTTONS | 1 | 2 | 1 |
| SELECTION OF BACKGROUND IMAGE | A | B | A |

IMAGE FORMING SYSTEM AND OPERATION UNIT

BACKGROUND OF THE INVENTION

Field of the Invention

The present invention relates to an image forming system including an image forming apparatus and an operation unit capable of communicating with the image forming apparatus, and an operation unit capable of communicating with an image forming apparatus.

Description of the Related Art

Conventionally, known has been an image forming apparatus to which the setting regarding image forming, such as the size of a sheet for image forming and the number of sheets for image forming, can be made with a mobile terminal.

US 2016/0352936 has disclosed a configuration in which setting information, such as the language, size, or font type of characters that are displayed on an operation portion provided at an image forming apparatus, can be set with a mobile terminal. The setting information can be changed with the operation portion with which the image forming apparatus is equipped.

US 2016/0352936 has disclosed a configuration in which the setting information stored in the image forming apparatus after the setting information is changed with the operation portion is prevented from being different from the setting information stored in the mobile terminal. Specifically, disclosed has been a configuration in which, in response to an instruction from the image forming apparatus, the setting information stored in the image forming apparatus is transmitted to the mobile terminal, so that the setting information stored in the mobile terminal is updated.

However, even with the present configuration, the setting information stored in the image forming apparatus is difficult to read out, based on an instruction from the mobile terminal. For example, let us assume that the setting information stored in the mobile terminal has disappeared. In such a case, when the user tries to operate the image forming apparatus through the mobile terminal, in order to retrieve the setting information used before, the user needs to operate the operation portion of the image forming apparatus.

SUMMARY OF THE INVENTION

According to a representative configuration of the present invention, provided is an image forming system including:

an image forming apparatus including: an image forming unit configured to perform image forming to a sheet; and a second memory; and an operation unit capable of communicating with the image forming apparatus, the operation unit being to be operated to issue an instruction for causing the image forming unit to perform the image forming, the operation unit including:

a display configured to display information; and a first memory in which display information regarding a display method for information to the display is stored, the display information corresponding to user information regarding a user having logged in, in which the second memory stores the display information, in which, based on a first instruction from the operation unit, the operation unit reads out the display information stored in the second memory and stores the display information into the first memory, and in which, based on a second instruction from the operation unit, the display information stored in the first memory is transmitted from the operation unit to the image forming apparatus and is stored into the second memory.

Further features of the present invention will become apparent from the following description of exemplary embodiments with reference to the attached drawings.

BRIEF DESCRIPTION OF THE DRAWINGS

FIG. 7 illustrates transition in Wi-Fi direct communication between the image forming apparatus and the remote operation panel;

FIG. 12 is a table storing setting information regarding a display method for information.

DESCRIPTION OF THE EMBODIMENTS

<Image Forming System>

The entire configuration of an image forming system according to an embodiment of the present invention will be described below together with the operation of an image forming apparatus 1 at the time of image forming, with reference to the drawings. Note that, unless otherwise specified, the dimensions, material, and shape of each of the following constituent components and the relative arrangement thereof should not be construed to limit the scope of the invention.

Figure 1:
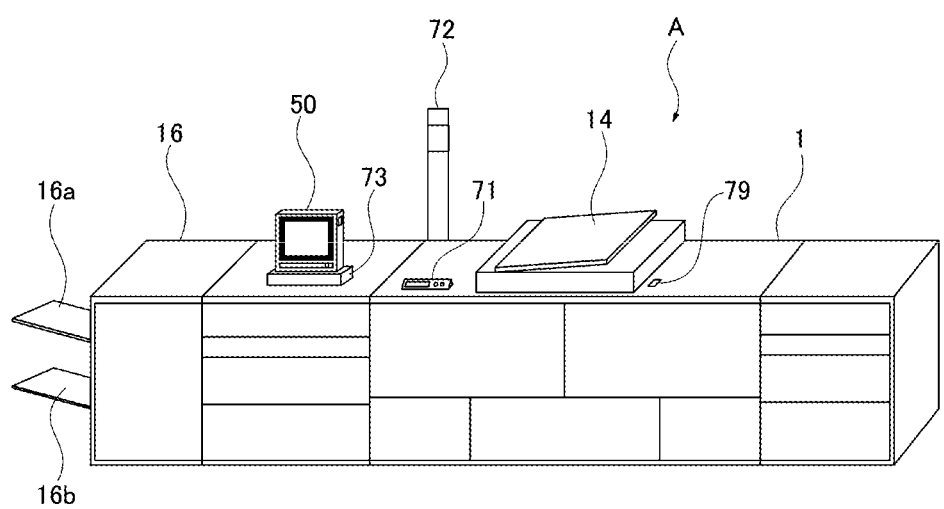
FIG. 1 is a schematic perspective view of an image forming system.

FIG. 1 is a schematic perspective view of the image forming system A equipped with the image forming apparatus 1. As illustrated in FIG. 1, the image forming system A includes the image forming apparatus 1 that forms an image on a sheet S, a postprocessing apparatus 16 that performs postprocessing, such as stapling and punching, to the sheet S having the image formed by the image forming apparatus 1, and a remote operation panel 50 to be described below. The image forming apparatus 1 has an upper portion provided with a reader 14 that optically reads an image of an original placed on a glass face not illustrated and converts the image into image data.

The image forming apparatus 1 includes a seesaw-type main power switch 79 that switches main power between on and off. The image forming apparatus 1 includes a display panel 71 that displays a lamp or an error code to notify a user of the state of the image forming apparatus 1, such as image forming processing in operation, suspension due to an error, or on standby. The image forming apparatus 1 includes a tower-type lamp 72 that turns on, off, or on and off its light source to notify the user at a distance of the state of the image forming apparatus 1.

The image forming apparatus 1 includes the remote operation panel (operation unit or wireless operation unit) 50 detachably attachable to a panel attachment portion 73. The remote operation panel 50 is capable of wireless communication with the image forming apparatus 1, enabling an operation at a location away from the image forming apparatus 1. When the remote operation panel 50 is attached to the panel attachment portion 73, a charging connector 55 of the remote operation panel 50 (refer to FIG. 2) is connected to a feeding connector 73a of the panel attachment portion 73 (refer to FIG. 5). Thus, the image forming apparatus 1 charges a battery 57 in the remote operation panel 50 (refer to FIG. 5).

Figure 2:
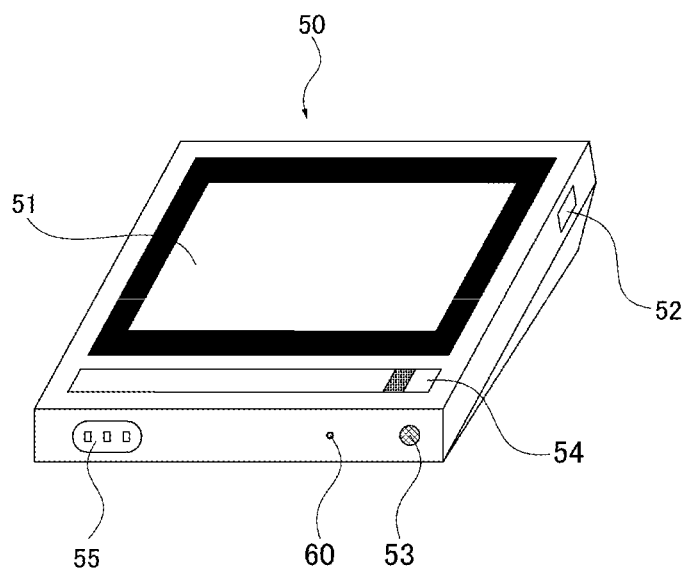
FIG. 2 is a schematic perspective view of a remote operation panel.

FIG. 2 is a schematic perspective view of the remote operation panel 50. As illustrated in FIG. 2, the remote operation panel 50 includes a power switch 52 that switches the power of the remote operation panel 50 between on and off, a speaker portion 53 that outputs sound, and an illumination portion 54 that includes an LED and turns on, off, or on and off the LED to give notice of the state of the remote operation panel 50.

The remote operation panel 50 includes a reset button 60 for returning the remote operation panel 50 to its original state at the time of shipping (initializing). If the remote operation panel 50 has the system or data damaged, for example, due to the impact of its fall, the user pushes the reset button 60, so that the remote operation panel 50 can return to its original state at the time of shipping. Note that the reset button 60 is provided inside a small hole so as not to be pushed accidentally. The user can push the reset button 60 by inserting an object having a fine leading end, such as a pin, into the hole.

The remote operation panel 50 includes a touch-panel display 51 including a display portion and an operation portion integrated together, in which the display portion displays an image and the operation portion enables input of information. The user touches a finger to a key displayed on the display 51, to input, for example, a numerical value, so that the setting regarding image forming of the image forming apparatus 1, such as a setting in the number of sheets for image forming and a setting in the size of a sheet S, or the setting regarding image reading, such as a setting in the size of an original, can be performed. Such types of setting are collectively referred to as the "setting regarding conditions for image forming". Note that, in the present embodiment, given has been the remote operation panel 50 equipped with the touch-panel display 51, but the present invention is not limited to this. Thus, as an operation portion enabling input of information, hardware keys, such as a numeric keypad and a reset key, may be provided separately. In this case, a portion corresponding to a screen that displays an image serves as a display. Instead of being provided as a hardware key, the reset button 60 may be displayed as a software key on the display 51.

Figure 3:
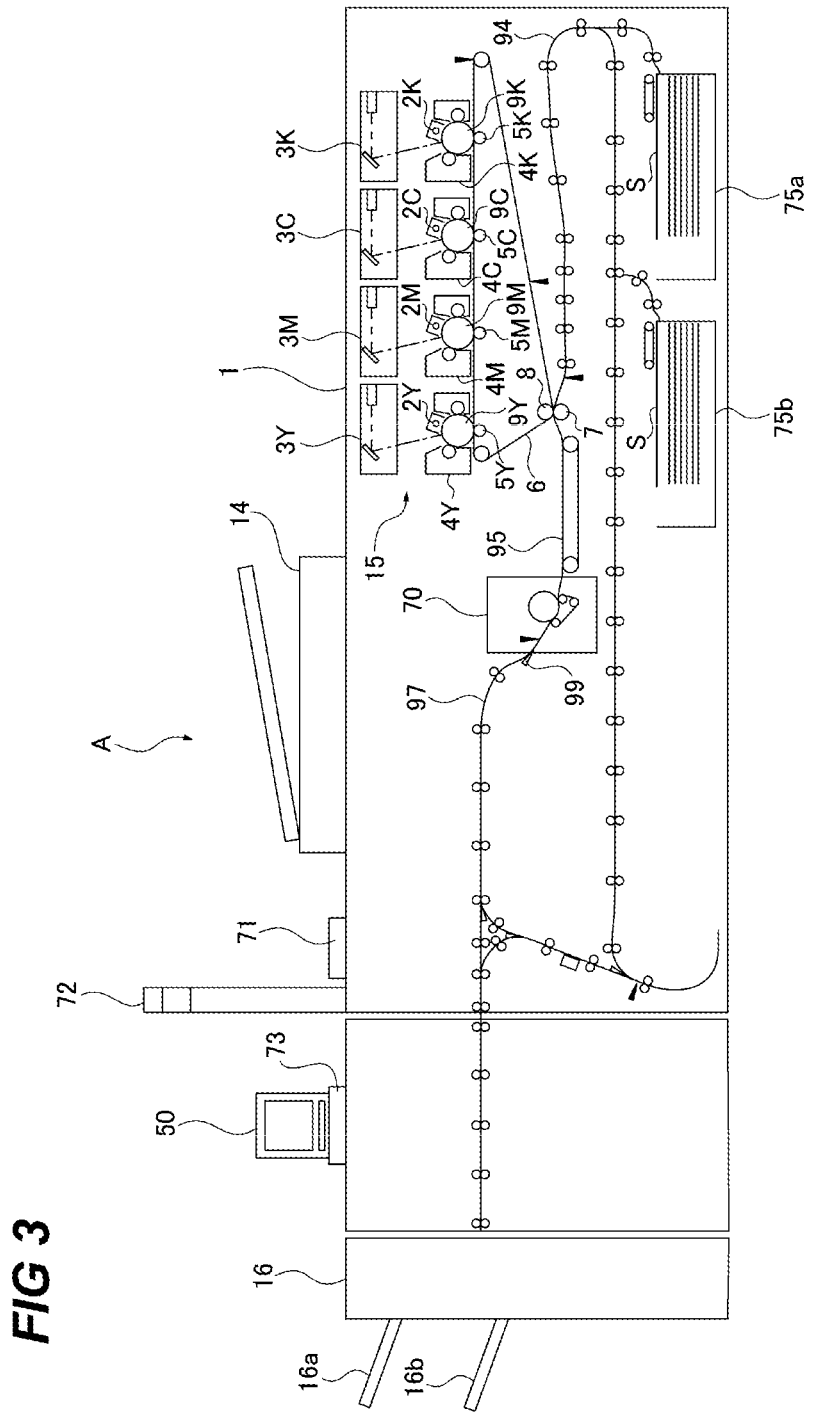
FIG. 3 is a schematic sectional view of the image forming system.

FIG. 3 is a schematic sectional view of the image forming system A. As illustrated in FIG. 3, the image forming apparatus 1 includes an image forming unit 15 that forms an image on a sheet S. The image forming unit 15 includes photoconductive drums 9Y, 9M, 9C, and 9K, charging devices 2Y, 2M, 2C, and 2K, and developing devices 4Y, 4M, 4C, and 4K. The image forming unit 15 includes primary transfer rollers 5Y, 5M, 5C, and 5K, laser scanner units 3Y, 3M, 3C, and 3K, an intermediate transfer belt 6, a secondary transfer roller 7, and a secondary transfer counter roller 8.

Figure 4:
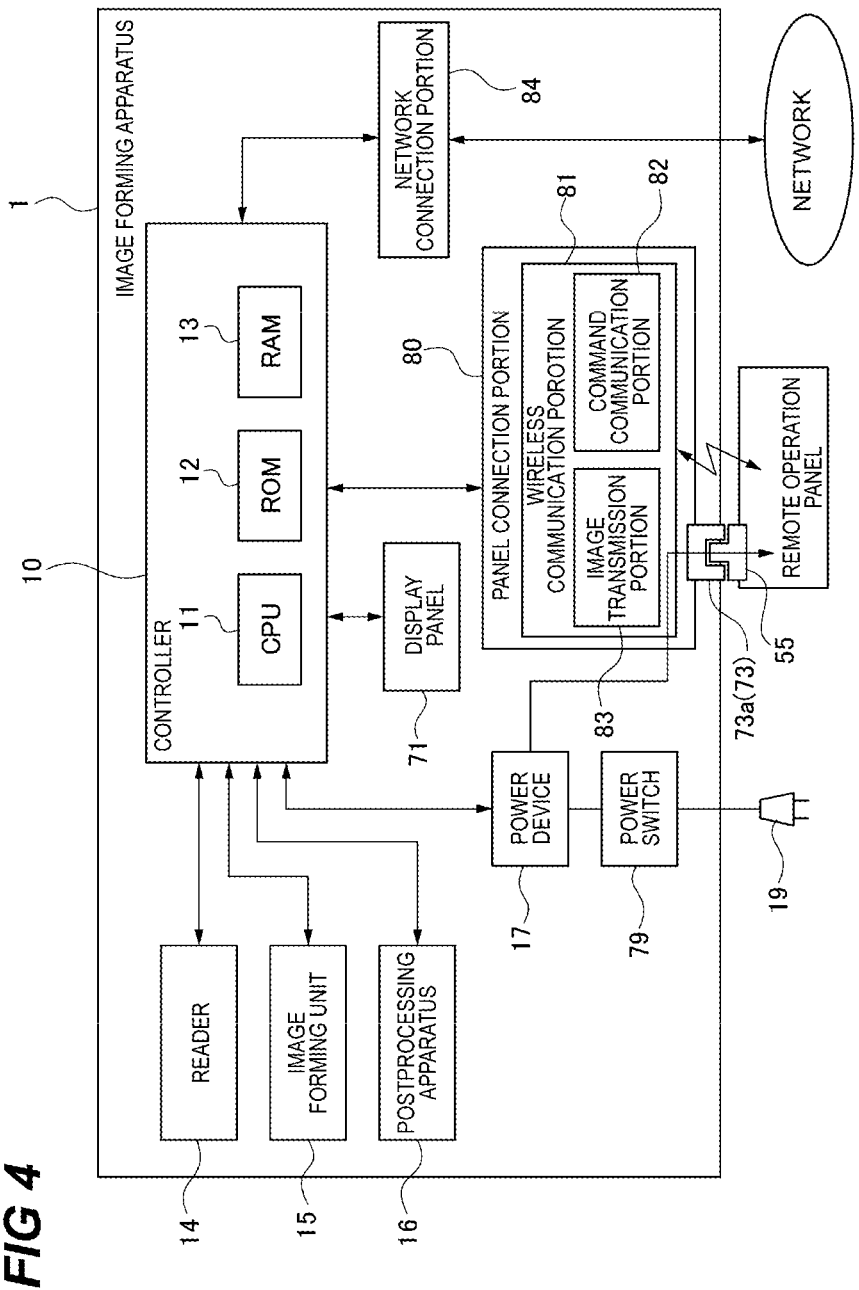
FIG. 4 is a block diagram of the system configuration of an image forming apparatus.

At the time of image forming of the image forming apparatus 1, first, an image-forming job signal is input to a controller 10 illustrated in FIG. 4. Thus, a sheet S housed in either a sheet cassette 75a or a sheet cassette 75b is sent to a conveyance path 94. After that, the sheet S is sent to a secondary transfer portion formed of the secondary transfer roller 7 and the secondary transfer counter roller 8 through the conveyance path 94.

Meanwhile, in the image forming unit 15, first, the charging device 2Y charges the surface of the photoconductive drum 9Y. After that, according to the image data of the original read by the reader 14 or image data transmitted from an external device not illustrated through a network, the laser scanner unit 3Y irradiates the surface of the photoconductive drum 9Y with laser light, to form an electrostatic latent image on the surface of the photoconductive drum 9Y.

Next, the developing device 4Y causes yellow toner to adhere to the electrostatic latent image formed on the surface of the photoconductive drum 9Y, resulting in formation of a yellow toner image on the surface of the photoconductive drum 9Y. The toner image formed on the surface of the photoconductive drum 9Y is primary-transferred to the intermediate transfer belt 6 due to application of a primary transfer bias to the primary transfer roller 5Y.

Due to similar processes, a magenta toner image, a cyan toner image, and a black toner image are formed on the photoconductive drums 9M, 9C, and 9K, respectively. Then, due to application of a primary transfer bias to each of the primary transfer rollers 5M, 5C, and 5K, the corresponding toner image is transferred so as to be superimposed on the yellow toner image on the intermediate transfer belt 6. Thus, a full-color toner image corresponding to the image signal is formed on the surface of the intermediate transfer belt 6.

After that, due to circumferential run of the intermediate transfer belt 6, the full-color toner image is sent to the secondary transfer portion. Then, due to application of a secondary transfer bias to the secondary transfer roller 7, the full-color toner image on the intermediate transfer belt 6 is transferred to the sheet S at the secondary transfer portion. The sheet S having the toner image transferred thereto is conveyed to a fixing device 70 by a conveyance belt 95. Then, the fixing device 70 heats the sheet S under pressure, so that the toner image is fixed to the sheet S.

Next, the sheet S having the toner image fixed thereto is sent to the postprocessing apparatus 16 through a discharge path 97. In a case where the user has designated postprocessing, such as stapling, punching, or binding, the sheet S sent to the postprocessing apparatus 16 is subjected to the designated postprocessing and then is discharged to a discharge tray 16a. In a case where the user has not designated any postprocessing, the sheet S sent to the postprocessing apparatus 16 is directly discharged to a discharge tray 16b without any postprocessing.

<System Configuration of Image Forming Apparatus>

Next, the system configuration of the image forming apparatus 1 will be described.

FIG. 4 is a block diagram of the system configuration of the image forming apparatus 1. As illustrated in FIG. 4, the image forming apparatus 1 includes the controller 10 including a CPU 11, a ROM 12 (second storage portion or second memory), and a RAM 13. The controller 10 is in connection with the reader 14, the image forming unit 15, the postprocessing apparatus 16, and the display panel 71. The controller 10 is in connection with a network connection portion 84 that establishes connection with an external device not illustrated through a network.

The ROM 12 has various types of programs regarding control of the image forming apparatus 1 and various types of data, stored therein. The CPU 11 performs various types of computing, based on a control program stored in the ROM 12. The RAM 13 temporarily stores data. That is, based on the control program stored in the ROM 12, with the RAM 13 as a work area, the CPU 11 controls, for example, the reader 14, the image forming unit 15, and the postprocessing apparatus 16 connected to the controller 10, to perform such an image forming operation as described above.

The controller 10 is in connection with a panel connection portion 80 that establishes connection with the remote operation panel 50. The panel connection portion 80 includes the panel attachment portion 73 having the feeding connector 73a to which the remote operation panel 50 is connected, and a wireless communication portion 81 that performs wireless communication with the remote operation panel 50. The charging connector 55 of the remote operation panel 50 is connected to the feeding connector 73a of the panel attachment portion 73.

The wireless communication portion 81 includes a command communication portion 82 and an image transmission portion 83. The CPU 11 reads out an image stored in the ROM 12 and transmits the image to the remote operation panel 50 through the image transmission portion 83 of the wireless communication portion 81. The CPU 11 generates an instruction to the remote operation panel 50 and transmits the instruction to the remote operation panel 50 through the command communication portion 82. The CPU 11 receives a notification or instruction generated in the remote operation panel 50 through the command communication portion 82. Note that, in the present embodiment, the command communication portion 82 and the image transmission portion 83 are separately provided, but both thereof may be collectively provided on a single communication line.

The image forming apparatus 1 and the remote operation panel 50 perform wireless communication via an access point 86 (refer to FIG. 6A), such as a Wi-Fi router, and then perform wireless communication based on Wi-Fi direct communication as a form of communication enabling inter-apparatus direction connection. Miracast, as a display transmission technique to which such a scheme of Wi-Fi direct communication as above is applied, is used, for example, in mobile phones, displays, and projectors. Note that, instead of Wi-Fi wireless communication, a different scheme of wireless communication, such as Bluetooth or NFC, may be provided. The remote operation panel 50 according to the present embodiment performs direction communication with the image forming apparatus 1 with no local area network. However, this is not limiting. Thus, a form of communication through a local area network or a form of wired communication may be provided.

The controller 10 is in connection with a power device 17. The power device 17 receives power from a commercial source of power through a power plug 19, performs conversion to power for use in each device, and supplies the power to each device. Specifically, first, when the main power switch 79 is switched from off to on, the power device 17 supplies power to the controller 10. After that, based on an instruction from the controller 10, the power device 17 supplies power, for example, to the reader 14, the image forming unit 15, the postprocessing apparatus 16, the display panel 71, the remote operation panel 50 attached to the panel attachment portion 73, the wireless communication portion 81, and the network connection portion 84.

<System Configuration of Remote Operation Panel>

Next, the system configuration of the remote operation panel 50 will be described.

Figure 5:
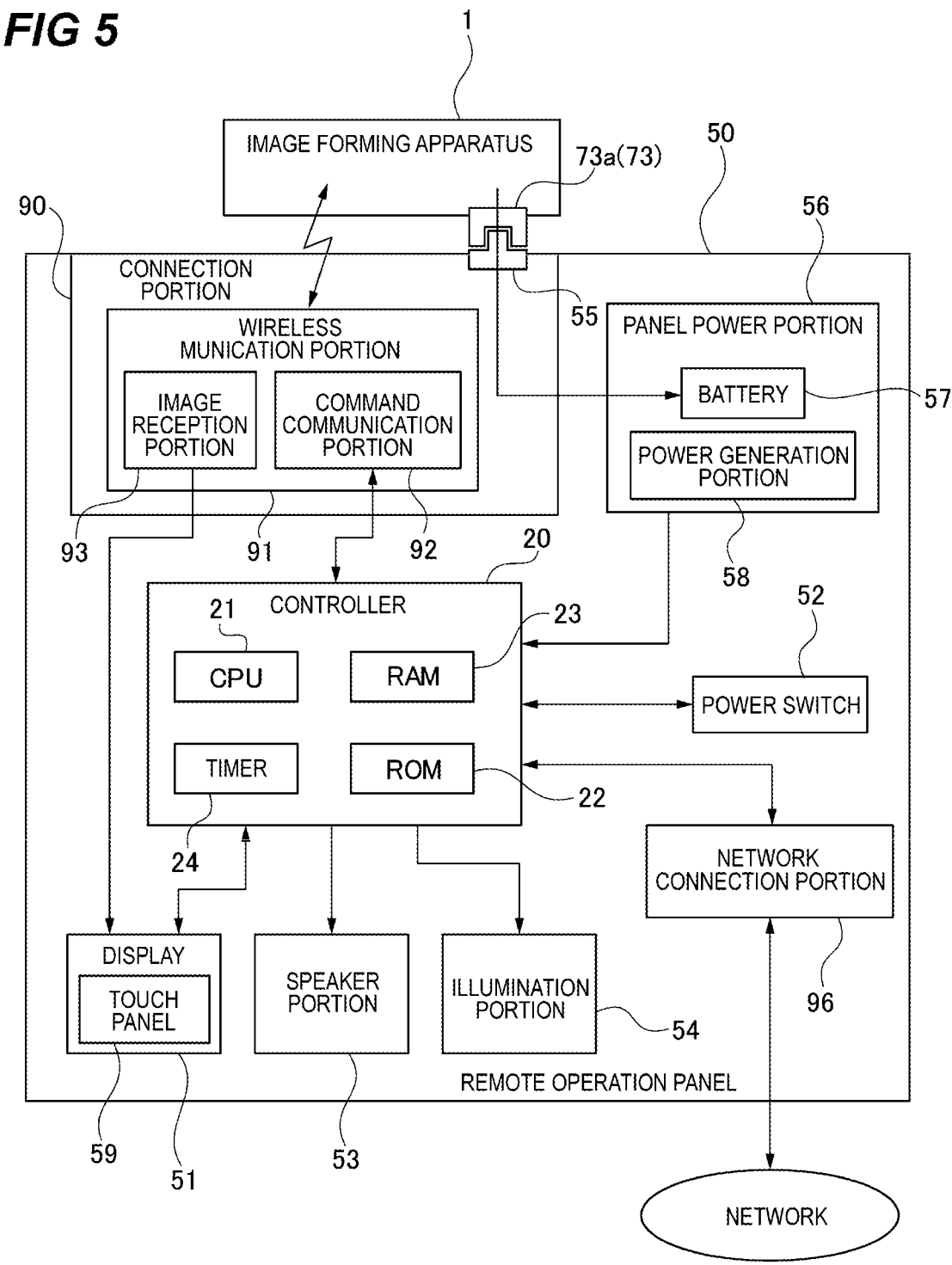
FIG. 5 is a block diagram of the system configuration of the remote operation panel.

FIG. 5 is a block diagram of the system configuration of the remote operation panel 50. As illustrated in FIG. 5, the remote operation panel 50 includes a controller 20 including a CPU 21 (display controller), a ROM 22 (first storage portion or first memory), a RAM 23, and a timer 24. The timer 24 measures time in various types of processing of the controller 20. The controller 20 is in connection with a network connection portion 96 that establishes connection with an external device not illustrated through a network.

The ROM 22 has various types of data, such as a program regarding control of the remote operation panel 50 and image data to be displayed on the display 51, stored therein. The CPU 21 performs various types of computing, based on a control program stored in the ROM 22. That is, for example, the controller 20 reads out information stored in the ROM 22 and controls the display 51 to display the information. The RAM 23 temporarily stores data. That is, based on the control program stored in the ROM 22, with the RAM 23 as a work area, the CPU 21 controls, for example, the display 51, the speaker portion 53, and the illumination portion 54 connected to the controller 20.

The remote operation panel 50 includes a connection portion 90 that establishes connection with the image forming apparatus 1. The connection portion 90 includes the charging connector 55 to be connected to the feeding connector 73a of the image forming apparatus 1, and a wireless communication portion 91 that performs wireless communication with the image forming apparatus 1.

The wireless communication portion 91 includes a command communication portion 92 connected to the CPU 21 and an image reception portion 93 connected to the display 51. The CPU 21 generates an instruction or notification to the image forming apparatus 1 and transmits the instruction or notification to the command communication portion 82 of the image forming apparatus 1 through the antenna not illustrated of the command communication portion 92. The CPU 21 receives, through the command communication portion 92, an instruction or information transmitted from the command communication portion 82 of the image forming apparatus 1.

The image reception portion 93 receives, through an antenna not illustrated, image data transmitted from the image transmission portion 83 of the image forming apparatus 1, converts the image data into image data to be displayed on the display 51, and displays the image data on the display 51. Note that, in the present embodiment, the command communication portion 92 and the image reception portion 93 are separately provided, but both thereof may be collectively provided on a single communication line.

The remote operation panel 50 includes a panel power portion 56. The panel power portion 56 includes the battery 57 and a power generation portion 58. The battery 57 is achieved by a rechargeable battery and serves as the main power source of the remote operation panel 50. When the charging connector 55 is connected to the feeding connector 73a of the image forming apparatus 1, the power device 17 of the image forming apparatus 1 supplies power to the battery 57, so that the battery 57 is charged. The power generation portion 58 adjusts power from the battery 57 to voltage available to each device in the remote operation panel 50. When the power switch 52 is switched from off to on, the power adjusted by the power generation portion 58 after charged in the battery 57 is supplied to the controller 20, the display 51, the speaker portion 53, the illumination portion 54, and the connection portion 90.

<Communication System Between Image Forming Apparatus and Remote Operation Panel>

Next, a communication system between an image forming apparatus 1 and a remote operation panel 50 will be described. Herein, a communication system between a single remote operation panel 50 and two image forming apparatuses 1 (1a and 1b) will be described.

Figure 6A:
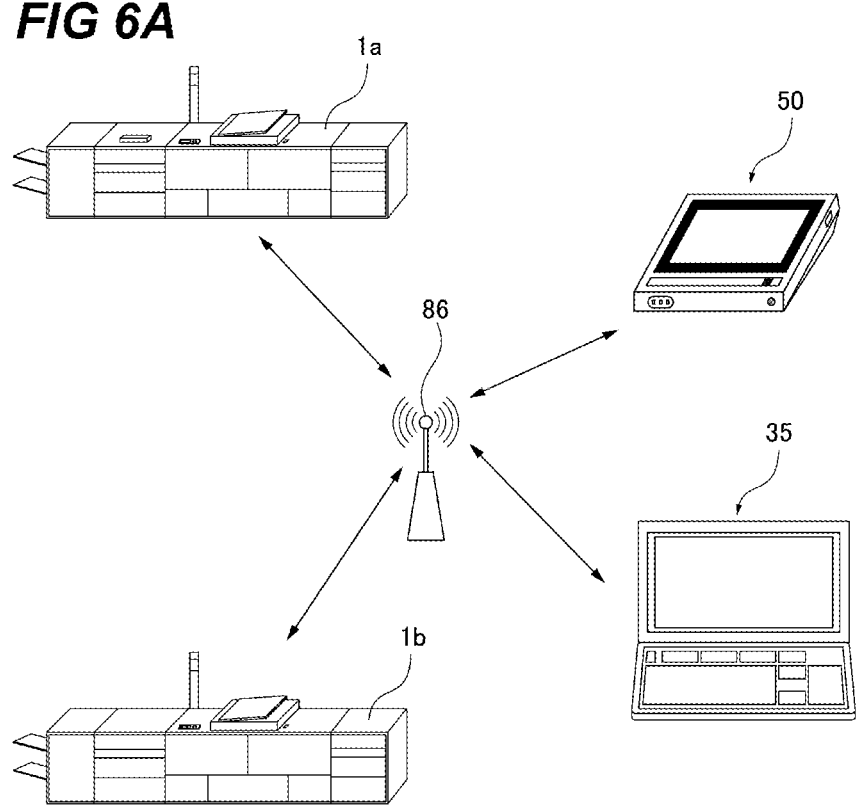
FIGS. 6A and 6B are schematic views of a communication system between an image forming apparatus and a remote operation panel.

FIG. 6A is a schematic view of a communication system through an access point 86 between a remote operation panel 50 and each image forming apparatus 1. As illustrated in FIG. 6A, the remote operation panel 50, the two image forming apparatuses 1 (1a and 1b), and a PC 35 are connected together via the access point 86. When the user turns on the power of the remote operation panel 50, the remote operation panel 50 notifies the image forming apparatuses 1 (1a and 1b) connected via the access point 86, of identification information on the remote operation panel 50, called SSID, stored in the ROM 22.

Each image forming apparatus 1 compares the notified identification information from the remote operation panel 50 with an identification information list stored in the ROM 12. Then, in a case where identification information identical to the notified identification information is present in the list, a reply indicating that the remote operation panel 50 is allowed to be connected to the image forming apparatus 1 is sent to the remote operation panel 50. In a case where no identification information identical to the notified identification information is present in the list, a reply indicating that the remote operation panel 50 is not allowed to be connected to the image forming apparatus 1 is sent to the remote operation panel 50.

Figure 9A:
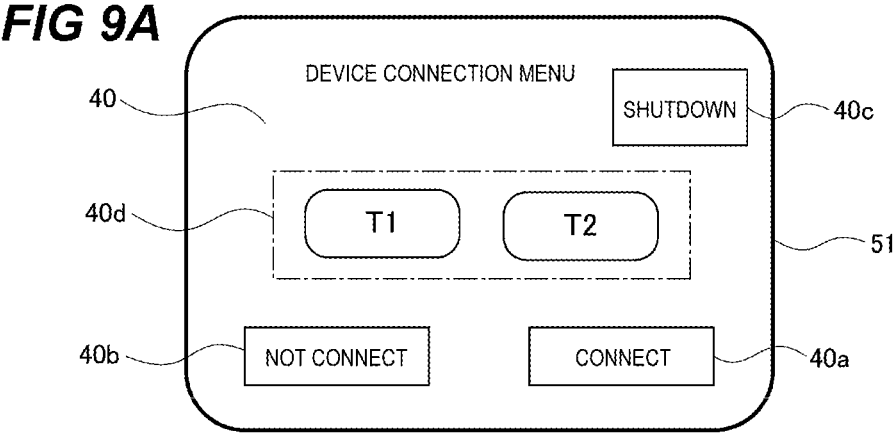
FIGS. 9A, 9B, and 9C illustrate display screens each displayed on the display of the remote operation panel.

The remote operation panel 50 displays, on the display 51, a list of any image forming apparatus 1 from which the replay indicating connection is allowed has been received (refer to FIG. 9A). While operating the remote operation panel 50, the user selects an image forming apparatus 1 to be used from the list of any image forming apparatus 1 allowing connection, displayed on the display 51.

Figure 6B:
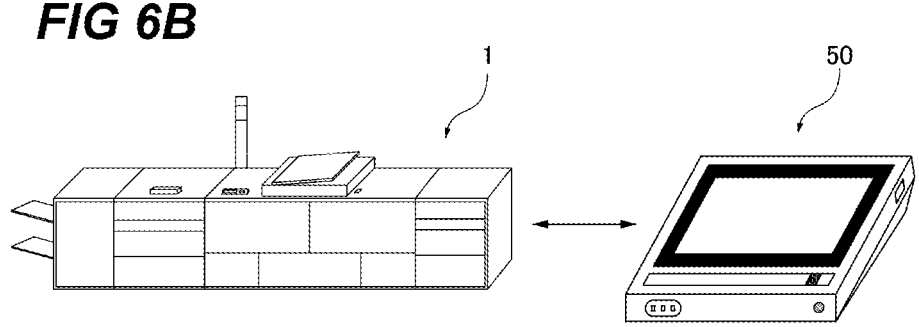

FIG. 6B is a schematic view of Wi-Fi direct connection between an image forming apparatus 1 and a remote operation panel 50. As illustrated in FIG. 6B, when an image forming apparatus 1 to be used is selected through the remote operation panel 50, according to a connection sequence to be described below, the connection between the image forming apparatus 1 and the remote operation panel 50 is switched from the connection via the access point 86 to Wi-Fi direct connection. This is because the Wi-Fi direct connection excels the connection via the access point 86 in responsivity for image display or in operability.

Note that, in the present embodiment, the description in which a remote operation panel 50 is connected to each image forming apparatus 1 via the access point 86 has been given, but the present invention is not limited to this. That is, like a scheme of Wi-Fi direct, a remote operation panel 50 and each image forming apparatus 1 may be directly connected without the access point 86.

<Wi-Fi Direct Communication Between Image Forming Apparatus and Remote Operation Panel>

Next, Wi-Fi direct communication between an image forming apparatus 1 and a remote operation panel 50 will be described.

FIG. 7 illustrates transition in Wi-Fi direct communication between an image forming apparatus 1 and a remote operation panel 50. As illustrated in FIG. 7, when the user selects an image forming apparatus 1 to be used from the image forming apparatuses 1 connected to the remote operation panel 50 through the access point 86, the connection sequence for establishment of Wi-Fi direct communication starts (S21 and S31).

After the connection sequence starts, first, the command communication portion 92 of the remote operation panel 50 transmits a negotiation request to the command communication portion 82 of the image forming apparatus 1 (S22). Next, the command communication portion 82 of the image forming apparatus 1 transmits a reply signal to the command communication portion 92 of the remote operation panel 50 (S32). When the remote operation panel 50 receives the replay signal, the connection sequence terminates, and the remote operation panel 50 logs in to the image forming apparatus 1. This results in establishment of Wi-Fi direct communication between the image forming apparatus 1 and the remote operation panel 50, enabling transmission and reception of information through the Wi-Fi direct communication.

Next, conditions for wireless communication, such as the rate of communication and the ratio of image compression, are set mutually between the image forming apparatus 1 and the remote operation panel 50 through the command communication portions 82 and 92 (S23 and S33). After the setting, according to an instruction from the CPU 11 of the image forming apparatus 1, a signal of an image stored in the ROM 12 of the image forming apparatus 1 is transmitted to the image reception portion 93 of the remote operation panel 50 through the image transmission portion 83 of the image forming apparatus 1 (S34).

Next, the image reception portion 93 of the remote operation panel 50 performs conversion to the received signal of the image, so that the image is displayed on the display 51. Note that, according to an instruction from the CPU 11 of the image forming apparatus 1, the remote operation panel 50 can display, on the display 51, an image stored in the ROM 12 of the image forming apparatus 1 or can display, on the display 51, an image stored in the ROM 22 of the remote operation panel 50. After that, in response to an operation from the user to the display 51, the CPU 21 of the remote operation panel 50 transmits operation information on the display 51 to the command communication portion 82 of the image forming apparatus 1 through the command communication portion 92 (S24).

Figure 8:
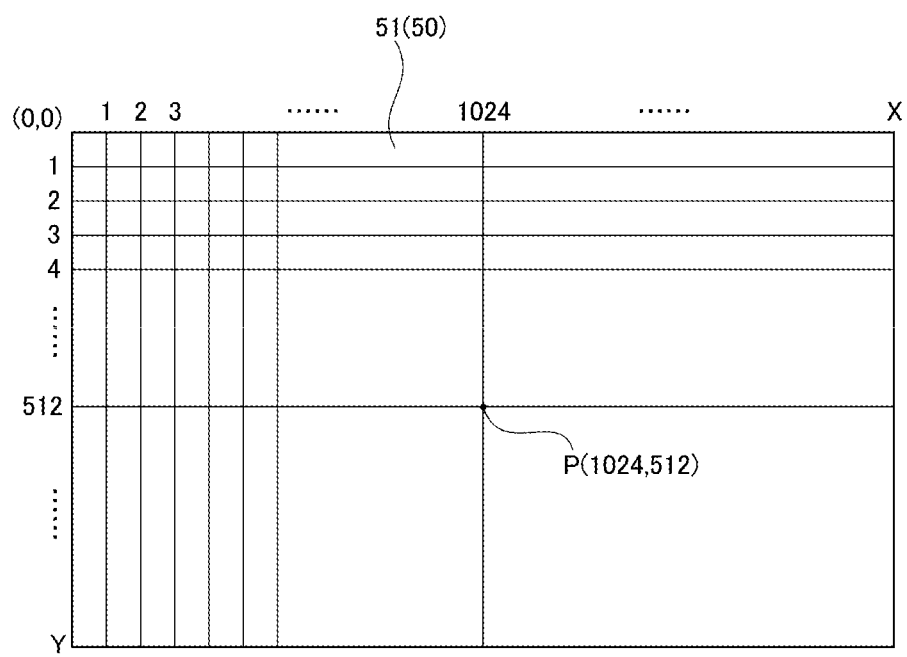
FIG. 8 illustrates a coordinate display on the display of the remote operation panel.

Here, the CPU 21 transmits, as coordinate information, the operation information on the display 51 to the image forming apparatus 1. Such a process will be described below. FIG. 8 illustrates a coordinate display on the display 51 of the remote operation panel 50. As illustrated in FIG. 8, the display 51 has divisions in the X direction and divisions in the Y direction. The number of divisions depends on the type of a touch panel, and the touch panel resistive in type in the present embodiment has 2048 divisions in the X direction and 1024 divisions in the Y direction.

With respect to the origin (0, 0), coordinates are denoted with (X, Y) according to the distance from the origin. For example, position P illustrated in FIG. 8 is denoted with (1024, 512) as its coordinates because of the location away by 1024 in the X direction and by 512 in the Y direction from the origin. Coordinate data is transmitted from a touch panel 59 of the display 51 (refer to FIG. 5) to the CPU 21 of the remote operation panel 50. Then, based on an instruction from the CPU 21, the coordinate data is transmitted from the command communication portion 92 to the image forming apparatus 1. Note that, in the present embodiment, because of an 8-bit length of communication between the image forming apparatus 1 and the remote operation panel 50, the numerical value of the coordinate data is divided by 8 for transmission. That is, the coordinates (1024, 512) are replaced with (128, 64) for transmission.

Based on the input coordinate data, the CPU 11 of the image forming apparatus 1 determines which location the user has touched on the display 51 of the remote operation panel 50. Then, according to the touched location, for example, image data is transmitted to or an instruction for control of lighting of the illumination portion 54 or an instruction for turning the speaker portion 53 on and off in sound is issued to the remote operation panel 50 (S35 and S36).

<Display Screens for Remote Operation Panel>

Next, display screens for the remote operation panel 50 will be described.

When the remote operation panel 50 starts up, a device-connection menu screen 40, illustrated in FIG. 9A, is displayed on the display 51. The device-connection menu screen 40 serves as a screen for connection with an image forming apparatus 1. The device-connection menu screen 40 has been previously stored in the ROM 22.

The device-connection menu screen 40 is provided with a connection-destination selection button 40d for selection of an image forming apparatus 1 as the connection destination for the remote operation panel 50. The connection-destination selection button 40d is displayed based on the apparatus name of each image forming apparatus 1 resulting from setting to each individual image forming apparatus 1 by the user. In the present embodiment, because an image forming apparatus 1 of which the apparatus name is "T1" and an image forming apparatus 1 of which the apparatus name is "T2" correspond to image forming apparatuses 1 to which the remote operation panel 50 can be connected, two buttons on which the apparatus names are displayed are displayed.

The user selects the connection-destination selection button 40d on which the apparatus name of an image forming apparatus 1 desired for connection is displayed, and then selects a connection button 40a. Thus, the remote operation panel 50 is connected to the image forming apparatus 1 selected with the connection-destination selection button 40d. In the present embodiment, for example, the image forming apparatus 1 of which the apparatus name is "T1" is the connection target. Note that, when the user selects a non-connection button 40b on the device-connection menu screen 40, the display screen on the display 51 transitions to another screen. When the user selects a shutdown button 40c on the device-connection menu screen 40, the remote operation panel 50 shuts down.

Figure 9B:
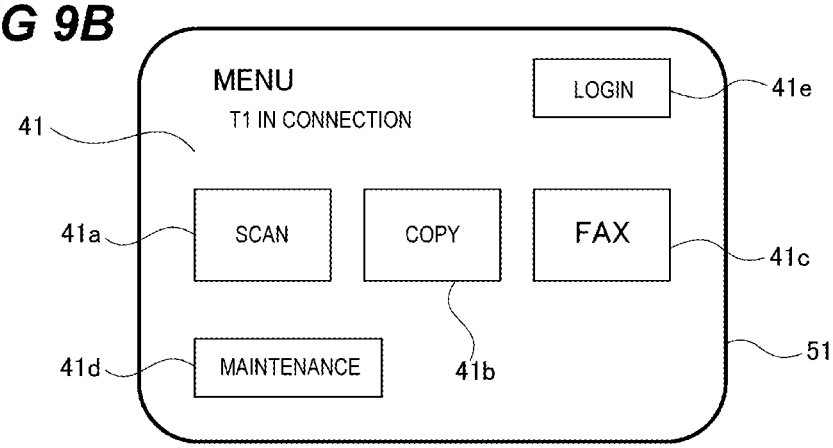

Next, when the remote operation panel 50 is connected to the image forming apparatus 1, a main menu screen 41, illustrated in FIG. 9B, is displayed on the display 51. The main menu screen 41 has been previously stored in the ROM 22. On the main menu screen 41, displayed is a button for selection of a typical function with which the image forming apparatus 1 is equipped. In the present embodiment, displayed are a scan button 41a for instructing the image forming apparatus 1 to perform scanning with the reader 14, a copy button 41b for instructing the image forming apparatus 1 to perform copying, and a FAX button 41c for instructing the image forming apparatus 1 to perform FAX transmission. In addition, displayed are a maintenance button 41d for a maintainer to conduct maintenance and a login button 41e for the user to log in to the remote operation panel 50 and the image forming apparatus 1.

When the user selects the copy button 41b, the display screen on the display 51 transitions to a copy setting screen not illustrated. On the copy setting screen, the user can conduct the setting regarding image forming of the image forming apparatus 1, such as adjustment in image quality including adjustment in image density and adjustment in color tone, and the number of sheets for copying. When the user selects the scan button 41a, the display screen on the display 51 transitions to a scan setting screen not illustrated. On the scan setting screen, the user can conduct the setting regarding image reading, such as a setting in resolution for an image to be read by the reader 14.

Figure 9C:
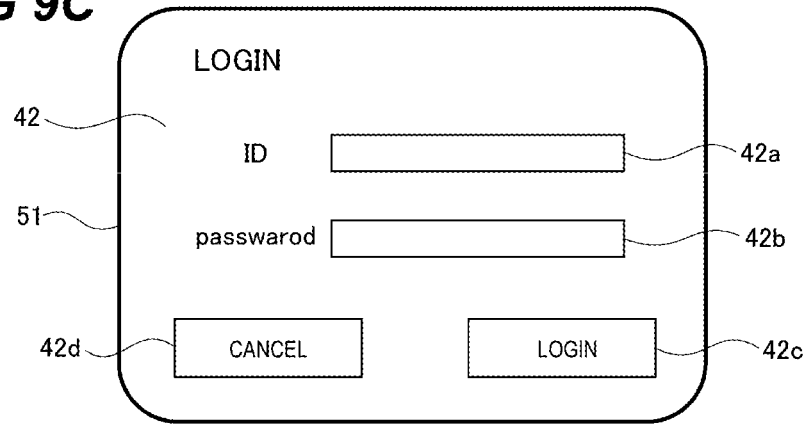

When the user selects the login button 41e, a login screen 42, illustrated in FIG. 9C, is displayed on the display 51. The login screen 42 has been previously stored in the ROM 22. The login screen 42 is provided with an ID input portion 42a to which the user inputs its ID (user identification information or user information) and a password input portion 42b to which the user inputs its password (user authentication information). The user inputs the values set by the user to the ID input portion 42a and the password input portion 42b and then selects a login button 42c.

In response to selection of the login button 42c, the CPU 21 of the remote operation panel 50 compares the ID and the password input by the user with a list of IDs and passwords stored in the ROM 22. In a case where an ID and a password in the list are identical to the input ID and password, the CPU 21 completes the login processing of the user to the remote operation panel 50. This results in a login state in which authentication has been made between the user and the remote operation panel 50. That is, the CPU 21 serves as an authentication portion that authenticates the user to use the remote operation panel 50.

After establishment of a login state between the user and the remote operation panel 50, the remote operation panel 50 transmits, to the image forming apparatus 1 as the connection destination, the ID and the password input by the user. The CPU 11 of the image forming apparatus 1 compares the ID and the password transmitted from the remote operation panel 50, with a list of IDs and passwords stored in the ROM 12. In a case where an ID and a password in the list are identical to the transmitted ID and password, the CPU 11 completes the login processing of the user and sends a reply indicating success in login to the remote operation panel 50. This results in a login state in which authentication has been made between the user and the image forming apparatus 1. That is, the CPU 11 serves as another authentication portion that authenticates the user to use the remote operation panel 50.

Note that, in the present embodiment, the user inputs its ID and its password at the time of login processing to the remote operation panel 50 or the image forming apparatus 1, but the user may input other information. As the user identification information or user authentication information, provided may be information in stored in a magnetic card or an IC card, or biological information, such as a fingerprint. When the user selects a logout button 43f, illustrated in FIG. 10A, displayed on the display 51, the image forming apparatus 1 and the remote operation panel 50 each perform logout processing for release from the login state. When the user selects a cancel button 42d on the login screen 42, the display screen returns to the previous screen.

Figure 10A:
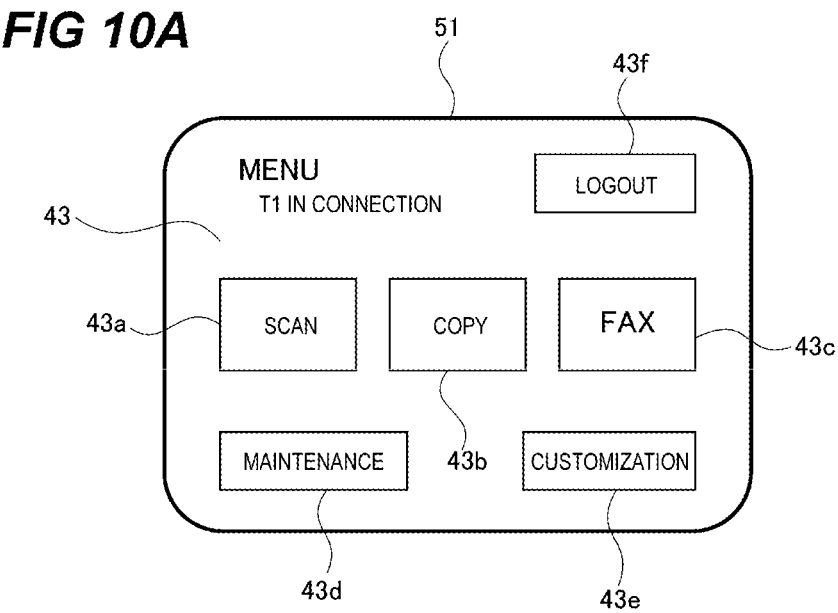
FIGS. 10A and 10B illustrate display screens each displayed on the display of the remote operation panel.

Next, after completion of the login processing of the user to the remote operation panel 50 and the image forming apparatus 1, a main menu screen 43, illustrated in FIG. 10A, is displayed on the display 51. The main menu screen 43 has been previously stored in the ROM 22. The main menu screen 43 is different from the main menu screen 41 illustrated in FIG. 9B in that the logout button 43f and a customization button 43e are added with no login button 41e. That is, a scan button 43a, a copy button 43b, a FAX button 43c, and a maintenance button 43d displayed on the main menu screen 43 are substantially the same as the scan button 41a, the copy button 41b, the FAX button 41c, and the maintenance button 41d displayed on the main menu screen 41, respectively. The main menu screen 43 is based on the setting regarding a display method for information to be described below. That is, display information as information regarding the display method has been previously stored in the ROM 22.

Figure 10B:
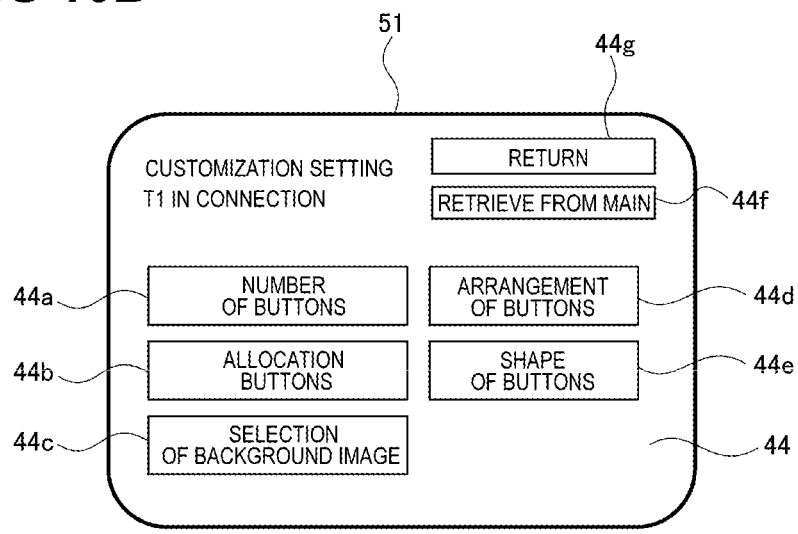

Next, when the user selects the customization button 43e, a customization screen (exemplary update screen) 44, illustrated in FIG. 10B, is displayed on the display 51. The customization screen 44 has been previously stored in the ROM 22. The customization screen 44 serves as a screen for the user to conduct the setting regarding the display method for information to be displayed on the display 51.

On the customization screen 44, displayed are a button 44a for setting of the number of buttons, a button 44b for setting of allocation of buttons, a button 44c for selection of a background screen, a button 44d for setting of arrangement of buttons, and a button 44e for setting of the shape of buttons. The user selects any of the buttons 44a to 44e, so that the setting regarding the display method for information to be displayed on the display 51, namely, update of the configuration of the screen can be performed. As above, the user can conduct customization for a favorite display style. Therefore, the ROM 22 has stored a plurality of pieces of display information corresponding to the user information (user identification information) regarding the user having logged in.

Figure 11A:
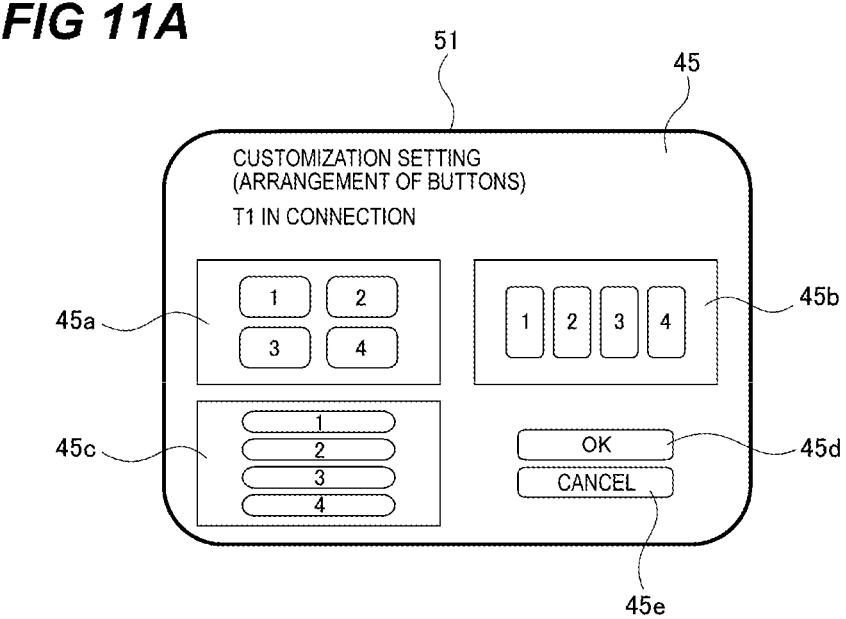
FIGS. 11A and 11B illustrate display screens each displayed on the display of the remote operation panel.

For example, when the user selects the button 44d for setting of arrangement of buttons, a button arrangement setting screen 45, illustrated in FIG. 11A, is displayed on the display 51. On the button arrangement setting screen 45, displayed are three types of buttons 45a to 45c on which different button arrangements are displayed, an OK button 45d, and a cancel button 45e for returning to the customization screen 44.

Figure 11B:
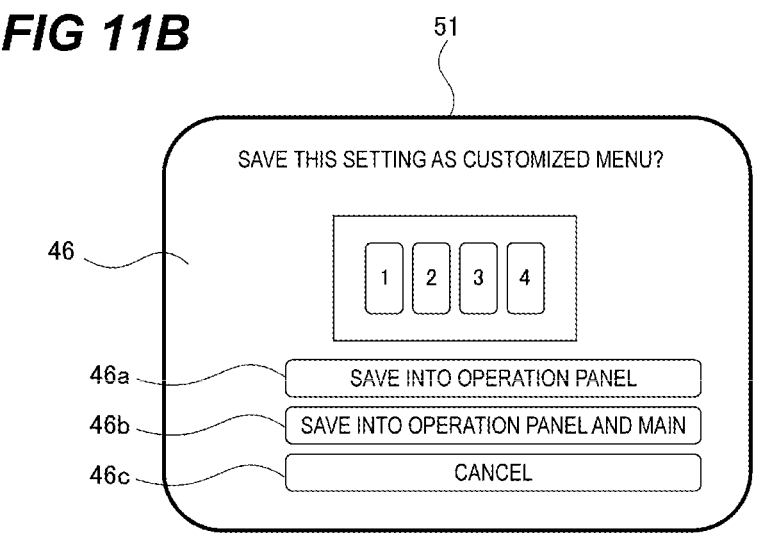

The user selects a button on which a desired button arrangement is displayed, from the buttons 45a to 45c and then selects the OK button 45d. Herein, for example, the user selects the button 45b. Thus, a save screen 46, illustrated in FIG. 11B, is displayed on the display 51. The save screen 46 has been previously stored in the ROM 22. On the save screen 46, displayed are a button 46a for saving the setting of the selected button arrangement into the remote operation panel 50, a button 46b for saving the setting of the selected button arrangement into the remote operation panel 50 and the image forming apparatus 1, and a cancel button 46c for returning to the previous screen.

A series of screens with which the display information is customized and the customized display information is saved, illustrated in FIGS. 10A to 11B, corresponds to the "update screen".

When the user selects the button 46a, the setting of the button arrangement selected by the user on the button arrangement setting screen 45 is saved in the ROM 22 of the remote operation panel 50. Specifically, the setting is saved in a table T storing setting information regarding the display method for information, illustrated in FIG. 12, generated in the ROM 22. Note that, although the case where the user selects the button 44d for setting of arrangement of buttons on the customization screen 44 has been given herein, similar processing is performed even in a case where any of the other buttons 44a, 44b, 44c, and 44e is selected.

In the table T, a default setting and a user setting are stored for each setting item. In the table T, the setting information regarding the display method for information can be stored for a plurality of users, and the setting information on each user is stored in association with the ID. For example, when a user of which the ID is "5X5X" makes a change from the default setting for the shape of buttons, the value "2", which is different from the default value and corresponds to a setting selected by the user, is input to the table T. When a user of which the ID is "6X6X" makes a change from the default setting for allocation of buttons, the value "2", which is different from the default value and corresponds to a setting selected by the user, is input to the table T. As above, storing the value corresponding to each item as the setting information, instead of storing an image itself, enables a reduction in the capacity for use in storing the setting information.

According to numerical values stored in the table T, the CPU 21 displays information on the display 51. For example, in a case where the numerical value for the shape of buttons, stored in the table T, is different from the default value, the CPU 21 displays information on the display 51 with the shape of buttons that corresponds to the numerical value and is different from the default shape of buttons. In the present embodiment, the CPU 21 refers to the table T at the point in time when the user logs in to the remote operation panel 50, and displays, on the display 51, the main menu screen 43 based on the setting regarding the display method for information, associated with the ID of the user.

When the user selects the button 46b on the save screen 46, the CPU 21 overwrites the value in the table T in the ROM 22 as above and then transmits the information on the table T to the command communication portion 82 of the image forming apparatus 1 through the command communication portion 92. Here, a signal generated along with selection of the button 46b by the user is an exemplary "second instruction". In other words, in response to the second instruction, (1) the CPU 21 overwrites the value in the table T in the ROM 22 as above, and (2) the CPU 11 of the image forming apparatus 1 saves the received information on the table T into the ROM 12. Thus, into the ROM 12 of the image forming apparatus 1, stored is information identical to the setting information regarding the display method for information stored in the ROM 22 of the remote operation panel 50. In other words, to the image forming apparatus 1 as the connection destination, backed up the table T as the setting information regarding the display method for information stored in the remote operation panel 50.

As above, in the present embodiment, the "second instruction" is, for example, based on an operation in which the user selects the button 46b, and corresponds to an instruction for storing the display information into the ROM 22.

Note that, at the time of transmission of the information on the table T to the image forming apparatus 1, instead of transmitting all the information, the CPU 21 may transmit the following information. That is, by comparing the information on the table T transmitted last time to the image forming apparatus 1 with the information on the table T currently stored in the ROM 22, the CPU 21 may transmit only different information therebetween to the image forming apparatus 1. This results in a reduction in data traffic, enabling a reduction in the duration of communication.

In the present embodiment, the description in which the table T as the setting information is stored in the ROM 12 of the image forming apparatus 1 has been given, but the present invention is not limited to this. That is, the table T may be stored, for example, in a storage area in a server provided outside the image forming apparatus 1.

<Restoration Sequence>

As described above, if the remote operation panel 50 has the system or data damaged, for example, due to the impact of its fall, the user pushes the reset button 60, so that the remote operation panel 50 returns to its original state at the time of shipping. In this case, the information on the table T stored in the ROM 22, namely, the setting information regarding the display method for information is deleted. Here, if the user conducts, again, the setting regarding the display method for information, the user is burdened in work. Thus, according to an instruction from the user, the CPU 21 of the remote operation panel 50 performs a restoration sequence, to restore the information on the table T formerly stored in the ROM 22. The restoration sequence will be described below with a flowchart illustrated in FIG. 13.

Figure 13:
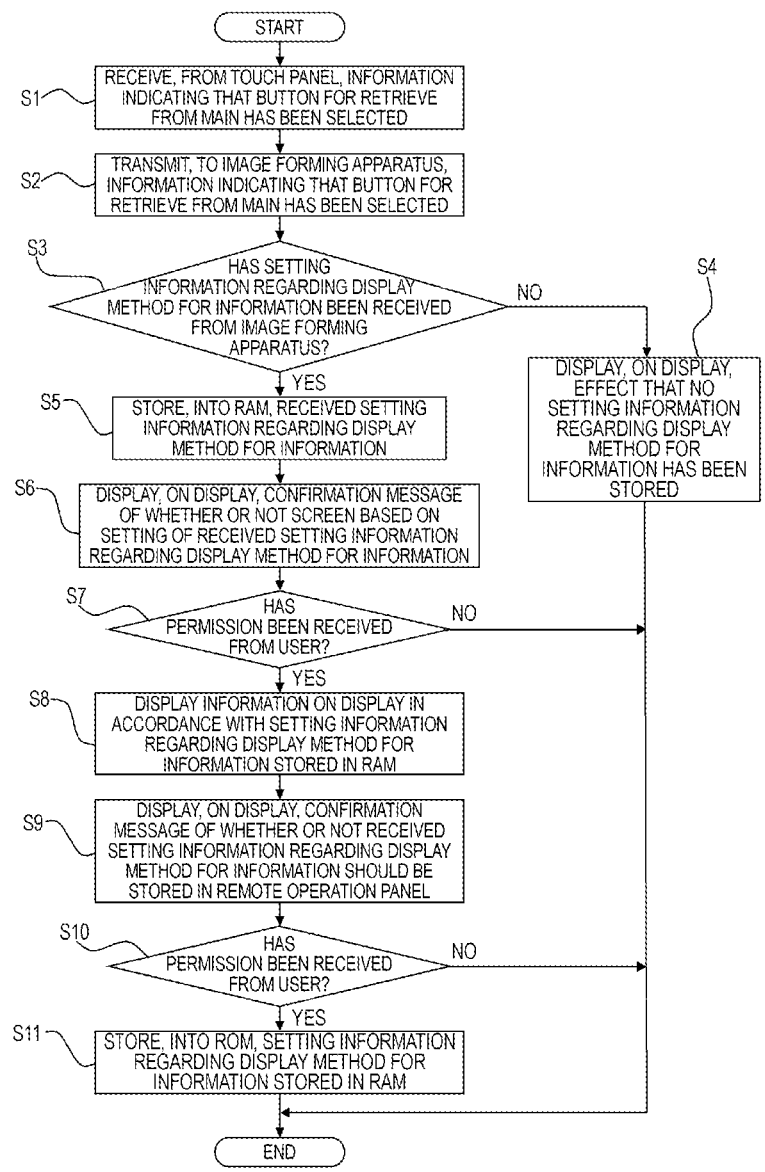
FIG. 13 is a flowchart of a restoration sequence.

As illustrated in FIG. 13, first, when receiving, from the touch panel 59, information indicating that the user has selected a button 44$f$ for retrieve from the main on the customization screen 44, the CPU 21 transmits, to the image forming apparatus 1, the information indicating that the button 44$f$ has been selected (S1 and S2). Here, a signal generated in response to selection of the button 44$f$ corresponds to a "first instruction". When receiving the information indicating that the button 44$f$ has been selected, the CPU 11 of the image forming apparatus 1 determines whether or not any setting information regarding the display method for information associated with the ID of the login user is present in the table T stored in the ROM 12.

When determining that no setting information regarding the display method for information associated with the ID of the login user is present in the table T in the ROM 12, the CPU 11 of the image forming apparatus 1 transmits information indicating the effect to the remote operation panel 50. When receiving, from the image forming apparatus 1, the information indicating that no setting information regarding the display method for information has been stored, the CPU 21 of the remote operation panel 50 displays the effect on the display 51, and then terminates the restoration sequence (S3 and S4).

Meanwhile, when determining that setting information regarding the display method for information associated with the ID of the login user is present in the table T in the ROM 12, the CPU 11 of the image forming apparatus 1 performs the following control. That is, the CPU 11 transmits, to the remote operation panel 50, partial information, in the information on the table T, associated with the ID of the login user.

When receiving, from the image forming apparatus 1, the partial information, in the table T, associated with the ID of the login user, the CPU 21 of the remote operation panel 50 temporarily stores the received information into the RAM 23 (S5). After that, the CPU 21 displays, on the display 51, a confirmation message of whether or not to display on the screen based on setting of the setting information regarding the display method for information transmitted from the image forming apparatus 1 should be displayed (S6). In a case where the user does not allow display of the screen based on the setting regarding the display method for information, the CPU 21 terminates the restoration sequence (S7). As described above, in response to the "first instruction" from the remote operation panel 50, the setting information regarding the display method (display information) stored in the ROM 12 is transmitted to the remote operation panel 50 and is stored in the ROM 22. That is, in the present embodiment, the "first instruction" is, for example, based on an operation in which the button 44$f$ is selected, and corresponds to an instruction for reading out the display information stored in the ROM 12 and storing the display information into the ROM 22.

In a case where the user allows display of the screen based on the setting regarding the display method for information, the CPU 21 displays information on the display 51, according to the setting information regarding the display method for information stored in the RAM 23 (S7 and S8). That is, the CPU 21 changes the display method for information, such as the shape of buttons, according to the setting information regarding the display method for information transmitted from the image forming apparatus 1.

Next, the CPU 21 displays, on the display 51, a confirmation message of whether or not the setting information regarding the display method for information transmitted from the image forming apparatus 1 should be stored in the remote operation panel 50 (S9). In a case where the user does not allow storing of the setting information regarding the display method for information transmitted from the image forming apparatus 1 into the remote operation panel 50, the CPU 21 terminates the restoration sequence (S10).

In a case where the user allows storing of the setting information regarding the display method for information transmitted from the image forming apparatus 1 into the remote operation panel 50, the CPU 21 stores, into the table T in ROM 22, the setting information regarding the display method for information stored in the RAM 23 (S10 and S11). This results in restoration of the setting regarding the display method for information formerly set by the user. Note that, even in a case where the remote operation panel 50 has not been initialized, the user can select the button 44$f$ for retrieve from the main. Therefore, in a case where the setting information regarding the display method for information associated with the ID of the login user has already been stored in the table T, the CPU 21 receives, from the user, a confirmation of whether or not an overwrite save is to be allowed, and then makes an overwrite save. After that, the CPU 21 terminates the restoration sequence.

As above, according to the present embodiment, the remote operation panel 50 performs the restoration sequence, so that the setting information regarding the display method for information stored in the ROM 12 of the image forming apparatus 1 can be received and stored in the ROM 22. Therefore, even in a case where the setting regarding the display method for information formerly set has disappeared, a reduction can be made in the burden of work at the time when the user conducts, again, the setting regarding the display method for information.

Note that, in the present embodiment, given has been the description in which, as the setting regarding the display method for information to be displayed on the display 51 of the remote operation panel 50, settings can be made for the number of buttons, allocation of buttons, a background screen, arrangement of buttons, and the shape of buttons. However, the present invention is not limited to this, and thus other setting items may be provided for the display method.

In the present embodiment, when the user selects the button 44f for retrieve from the main, the restoration sequence starts, but the present invention is not limited to this. That is, for example, at the time of the first login at which the user logs in to the remote operation panel 50 and the image forming apparatus 1 for the first time after pushing the reset button 60, the display 51 may display a screen for confirmation of whether or not the restoration sequence should be performed. In a case where the setting information regarding the display method for information for the login user has not been stored in the ROM 22 of the remote operation panel 50 but has been stored in the ROM 12 of the image forming apparatus 1, the display 51 may display a screen for confirmation of whether or not the restoration sequence should be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-059144, filed Mar. 31, 2021, which is hereby incorporated by reference herein in its entirety.

What is claimed is:

1. An image forming system comprising:
   an image forming apparatus including:
      an image forming engine configured to perform image forming to a sheet; and
      a second memory; and
   an operation unit communicable with the image forming apparatus, the operation unit being operable to issue an instruction for causing the image forming unit to perform the image forming, the operation unit including:
      a display configured to display information; and
      a first memory storing display information regarding a display mode for the display, the display information corresponding to user information regarding a user having logged in,
   wherein the second memory stores the display information,
   wherein, based on a first instruction from the operation unit, the operation unit reads the display information stored in the second memory and stores the display information into the first memory, and
   wherein, based on a second instruction from the operation unit, the display information stored in the first memory is transmitted from the operation unit to the image forming apparatus and is stored into the second memory.

2. The image forming system according to claim 1, wherein the first instruction serves as an instruction for reading the display information stored in the second memory and storing the display information into the first memory.

3. The image forming system according to claim 1, wherein:
   the display information is updatable by the user having logged in,
   a storage icon to be selected to store the display information after update into the first memory is displayable on an update screen for update of the display information, and
   the second instruction corresponds to a signal generated in response to selection of the storage icon.

4. The image forming system according to claim 1, wherein in each of the first memory and the second memory, a plurality of pieces of the display information corresponding one-to-one to a plurality of pieces of user information are stored.

5. The image forming system according to claim 4, wherein:
   the operation unit includes a controller configured to read, from the first memory, the display information corresponding to each of the plurality of pieces of user information and display the display information on the display, and
   the controller reads, in response to login of the user, from the first memory, the display information corresponding to the user information on the user having logged in and displays the display information on the display.

6. The image forming system according to claim 1, wherein as transmission of the display information to the image forming apparatus based on the second instruction, regarding the display information corresponding to the user information on the user having logged in, the operation unit transmits, to the image forming apparatus, difference information between the display information stored in the first memory and the display information stored in the second memory.

7. The image forming system according to claim 1, wherein wireless communication is performed, with no local area network, between the image forming apparatus and the operation unit.

8. The image forming system according to claim 1, wherein the display information is updatable by the user having logged in and indicates a configuration of a screen to be displayed on the display, on an update screen for update of the display information, and the configuration is settable by the user.

9. The image forming system according to claim 8, wherein information that the user sets on the update screen includes information regarding a display position of an icon corresponding to an instruction from the user.

10. The image forming system according to claim 8, wherein information that the user sets on the update screen includes information regarding a type of an icon corresponding to an instruction form the user.

11. An operation unit for use in operating of an image forming apparatus including an image forming engine configured to perform image forming to a sheet, and a second memory, the operation unit being communicable with the image forming apparatus and comprising:
   a user interface configured to receive an operation for transmitting, to the image forming apparatus, an instruction for causing the image forming unit to perform the image forming;
   a display configured to display an operation screen for the operation; and
   a first memory storing display information regarding a display mode for the display, the display information corresponding to user information regarding a user having logged in,
   wherein, based on a first instruction, the display information stored in the second memory of the image forming apparatus is read and is stored into the first memory, and
   wherein, based on a second instruction, the display information stored in the first memory is transmitted to the image forming apparatus and is stored into the second memory.

12. The operation unit according to claim 11, wherein the first instruction is input by the user through the user interface to read the display information stored in the second memory and store the display information into the first memory.

13. The operation unit according to claim 11, wherein;
the display information is updatable by the user having logged in,
a storage icon to be selected to store the display information after update into the first memory is displayable on an update screen for update of the display information, and
the second instruction corresponds to a signal generated in response to selection of the storage icon.

14. The operation unit according to claim 11, wherein in the first memory, a plurality of pieces of the display information corresponding one-to-one to a plurality of pieces of user information are stored.

15. The operation unit according to claim 14, further comprising:
a controller configured to read, from the first memory, the display information corresponding to each of the plurality of pieces of user information and display the display information on the display,
wherein the controller reads, in response to login of the user, from the first memory, the display information corresponding to the user information on the user having logged in and displays the display information on the display.

16. The operation unit according to claim 11, wherein as transmission of the display information to the image forming apparatus based on the second instruction, regarding the display information corresponding to the user information on the user having logged in, the operation unit transmits, to the image forming apparatus, difference information between the display information stored in the first memory and the display information stored in the second memory.

17. The operation unit according to claim 11, wherein the operation unit performs wireless communication with the image forming apparatus with no local area network.

18. The operation unit according to claim 11, wherein the display information is updatable by the user having logged in and indicates a configuration of a screen to be displayed on the display, on an update screen for update of the display information, and the configuration is settable by the user.

19. The operation unit according to claim 18, wherein information that the user sets on the update screen includes information regarding a display position of an icon corresponding to an instruction from the user.

20. The operation unit according to claim 18, wherein information that the user sets on the update screen includes information regarding a type of an icon corresponding to an instruction form the user.

* * * * *